(12) United States Patent
Ghaemi et al.

(10) Patent No.: US 12,182,145 B2
(45) Date of Patent: Dec. 31, 2024

(54) REMOTE DATA BLENDING

(71) Applicant: SAP SE, Walldorf (DE)

(72) Inventors: Houman Ghaemi, Vancouver (CA);
Darryl Eckstein, Vancouver (CA);
Mark Obad, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/563,879

(22) Filed: Dec. 28, 2021

(65) Prior Publication Data
US 2022/0121663 A1    Apr. 21, 2022

Related U.S. Application Data

(63) Continuation of application No. 16/041,557, filed on Jul. 20, 2018, now Pat. No. 11,226,974.

(60) Provisional application No. 62/669,835, filed on May 10, 2018.

(51) Int. Cl.
*G06F 16/2458* (2019.01)
*G06F 16/22* (2019.01)
*G06F 16/27* (2019.01)

(52) U.S. Cl.
CPC .......... *G06F 16/2471* (2019.01); *G06F 16/22* (2019.01); *G06F 16/27* (2019.01)

(58) Field of Classification Search
CPC .............................. G06F 16/22; G06F 16/2471
See application file for complete search history.

(56) References Cited

U.S. PATENT DOCUMENTS

| | | | |
|---|---|---|---|
| 5,991,754 A | 11/1999 | Raitto et al. | |
| 7,103,593 B2 | 9/2006 | Dean | |
| 7,302,425 B1 | 11/2007 | Bernstein et al. | |
| 7,461,057 B2 | 12/2008 | Radestock et al. | |
| 7,840,607 B2 | 11/2010 | Henigman et al. | |
| 9,633,076 B1 | 4/2017 | Morton et al. | |
| 2002/0070953 A1 | 6/2002 | Barg et al. | |
| 2004/0230571 A1 | 11/2004 | Robertson | |
| 2005/0283468 A1* | 12/2005 | Kamvar | G06F 16/3325 707/999.003 |
| 2006/0116975 A1 | 6/2006 | Gould et al. | |
| 2006/0130056 A1* | 6/2006 | Bozak | G06F 8/61 717/174 |
| 2007/0198601 A1 | 8/2007 | Prahlad et al. | |

(Continued)

FOREIGN PATENT DOCUMENTS

WO    2012125166    9/2012

OTHER PUBLICATIONS

Alan Eldridge, "Best Practices for Designing Efficient Tableau Workbooks", Tableau Workbooks, Jan. 31, 2013 2013, pp. 1-33.
Pit Fender, "Section 1.1, Motivation" In: Efficient Memorization Algorithms for Query Optimization, Dec. 11, 2014, Anchor Publishing, Hamburg, pp. 15-17.
Grant Fritchey, "Chapter 9: Execution plan Cache Analysis" In: "SQL Server 2012 Query Performance Tuning," Jun. 19, 2012, Apress, Berkely, CA, pp. 241-279.

(Continued)

*Primary Examiner* — Pierre M Vital
*Assistant Examiner* — Jedidiah P Ferrer
(74) *Attorney, Agent, or Firm* — Fountainhead Law Group, PC

(57) ABSTRACT

The present disclosure provides improved systems, methods, and computer readable media for blending data from data sets that reside on different systems. This is done by generating subqueries from a main data model blend query, sending the subqueries to respective separate systems, accessing the results to all subqueries at a primary system, and performing a blend based on the main data model blend query at the primary system.

20 Claims, 10 Drawing Sheets

(56) References Cited

U.S. PATENT DOCUMENTS

| | | | |
|---|---|---|---|
| 2009/0006318 A1 | 1/2009 | Lehtipalo et al. | |
| 2009/0313268 A1 | 12/2009 | Folting et al. | |
| 2010/0134501 A1 | 6/2010 | Lowe et al. | |
| 2010/0281053 A1* | 11/2010 | Braines | G06F 16/2471 707/770 |
| 2013/0110792 A1 | 5/2013 | Hudis et al. | |
| 2013/0117217 A1 | 5/2013 | Bhide et al. | |
| 2013/0346429 A1 | 12/2013 | Bratz et al. | |
| 2014/0074801 A1 | 3/2014 | Kacher et al. | |
| 2014/0193116 A1 | 7/2014 | Bylander et al. | |
| 2015/0242464 A1* | 8/2015 | Nguyen | G06F 16/24539 707/721 |
| 2015/0310067 A1 | 10/2015 | Svoboda et al. | |
| 2016/0092575 A1 | 3/2016 | Nguyen et al. | |
| 2016/0292895 A1 | 10/2016 | Billi et al. | |
| 2016/0381121 A1* | 12/2016 | Costantino | G06F 16/245 709/219 |
| 2017/0185655 A1 | 6/2017 | Jahankhani et al. | |
| 2017/0193024 A1 | 7/2017 | Fung et al. | |
| 2017/0193116 A1* | 7/2017 | Wong | G06F 16/2456 |
| 2018/0088566 A1 | 3/2018 | Billi-Duran et al. | |
| 2018/0089324 A1* | 3/2018 | Pal | G06F 16/9535 |
| 2018/0173767 A1* | 6/2018 | Langseth | G06F 16/248 |
| 2018/0181617 A1 | 6/2018 | Ghaemi et al. | |

OTHER PUBLICATIONS

Anonymous, "Artifact (software development)", Wikipedia, Oct. 28, 2015, retrieved from the Internet: URL:https://en.wikipedia.org/w/index.php?title=Artifact_(software_development)&oldid=687975121, pp. 1-2.

Anonymous, "Subset", Wikipedia, Dec. 17, 2015, retrieved from the Internet: URL:https://en.wikipedia.org/w/index.php?title=Subset&oldid=695672410, pp. 1-4.

Tableau Software: Data Blending: Uncovering the Magic and Mystery (In English), YouTube, Nov. 20, 2014, Retrieved from the Internet: URL:https://www.youtube.com/watch?v=6cMri9oXLfw.

European Search Report, dated Mar. 24, 2017, from a corresponding foreign application, EP 16002728.0, 18 pages.

Extended European Search Report, dated May 19, 2017, from a corresponding foreign application, EP 16002750.4, 10 pages.

Kristi Morton et al., "Dynamic Workload Driven Data Integration in Tableau", Proceedings of the 2012 International Conference on Management of Data, SIGMOD '12, May 20-24, 2012, 9 pages.

Internet article entitled "What is Data Blending?", retrieved from http://www.datawatch.com/what-is-data-blending/, retrieved Dec. 28, 2015, pp. 1-2.

Anonymous, "Definitive Guide to Data Blending" Aug. 1, 2014, 6 pages.

European Search Report, dated Dec. 7, 2018, from a corresponding foreign application, EP 18196747.2, 10 pages.

* cited by examiner

| COUNTRY | POPULATION | REVENUE | UNITS |
|---|---|---|---|
| United States | 322 Million | $ 15 Trillion | 52,000 |
| Canada | 35 Million | $ 90 Billion | 2,000 |
| Germany | 81 Million | ----- | ----- |

Blend Node 1
Data Structure
220

Joined Column
221

REMOTE DATA BLENDING

CROSS REFERENCE TO RELATED APPLICATION

This application is a continuation of U.S. application Ser. No. 16/041,557, filed Jul. 20, 2018, which claims the benefit of U.S. Provisional Application No. 62/669,835, filed May 10, 2018, the contents of which are incorporated herein by reference for all purposes.

BACKGROUND

The present disclosure relates generally to client-server computer systems, and in particular, to remotely blending data operations across multiple data sets across multiple computer systems.

Merging data from database tables or other data structures in a database system has various drawbacks. For example, merging data typically includes merging all data from multiple sources in a data merge process. As such, data processing on a data set resulting from a data merge operation can incur significant resources and expenses in terms of memory space, network bandwidth, and processor activity. Conversely, data blending techniques can improve on known data merging processes by extracting data from multiple data sources to discover useful correlations, while excluding any unnecessary data from the multiple data sources.

Unfortunately, data blending processes are typically required to take place on a single system having all of the data sets to be used. Blending data from data sets that reside on different systems raises many programming challenges.

The present disclosure provides improved systems and techniques for blending data from separate data sets that reside on different systems.

SUMMARY

The present disclosure provides improved systems, methods, and computer readable media for blending data from separate data sets that reside on different systems. This is done by generating subqueries from a main data model blend query, sending the subqueries to respective separate systems, accessing the results to all subqueries at a primary system, and performing a blend based on the main data model blend query at the primary system.

For example, in one embodiment, the present disclosure include a method, comprising receiving input at a client system in communication with a primary system and with one or more remote systems, the primary system having at least one data set and the one or more remote systems having separate data sets, wherein the input specifies a main data model blend query for a main data model blend that blends data from separate data sets at the primary system and at least one of the one or more remote systems, generating, at the client system, one or more subqueries from the main data model blend query, wherein each subquery corresponds to a different remote system having a remote system data set that is to be blended in the main data model blend, sending, from the client system, each of the one or more subqueries to a corresponding remote system for execution on the remote system data set at the corresponding remote system, receiving, at the client system from each corresponding remote system, information regarding a set of subquery results from executing the respective subquery on the remote system data set at the corresponding remote system, and sending, from the client system to the primary system, the main data model blend query, wherein the main data model blend query comprises information for accessing the subquery results, wherein the primary system accesses the subquery results and blends the subquery results.

In one embodiment, the method further comprises using the information for accessing the subquery results at the primary system to retrieve each set of subquery results from its corresponding remote system and performing a data blend operation at the primary system based on the main data model blend query and the retrieved sets of subquery results from each of the remote systems.

In one embodiment, the information for accessing the subquery results includes information regarding where to retrieve each set of subquery results from each respective remote system.

In one embodiment, a data provisioning agent facilitates communication between the primary system and at least one of the corresponding remote systems, the data provisioning agent being separate from the client system.

In one embodiment, the method further comprises executing each of the one or more subqueries on a remote system data set at the subqueries' corresponding remote system to provide a set of subquery results and storing each set of subquery results on each respective corresponding remote system.

In one embodiment, each set of subquery results is stored in a serialized data format.

In one embodiment, the method further comprises receiving, in the primary system, metadata describing each subquery result.

In one embodiment, wherein the metadata is configured to allow a reconstruction of the subquery results from the serialized data format to a cube format for data blending operations on the primary system.

In one embodiment, the method further comprises sending from the client system to the primary system a subquery for execution on a primary data set at the primary system.

In one embodiment, the results of the subquery to be performed at the primary system are not to be converted into a serialized data format.

In one embodiment, the information regarding a set of subquery results comprises information that the subquery results are done.

In one embodiment, the method further comprises generating, on the client system, a table associating each subquery with a particular remote system, and wherein the information for accessing the subquery results comprises information from the table.

In one embodiment, the received information includes the set of subquery results.

In one embodiment, the client system sends to the primary system each set of subquery results.

In one embodiment, no communication takes place between the primary system and any of the one or more remote systems.

Other apparatuses, systems, methods, features and advantages of the disclosure will be or will become apparent to one with skill in the art upon examination of the following figures and detailed description. It is intended that all additional apparatuses, systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the systems, methods, and computer readable media for remote data blending disclosed herein.

DETAILED DESCRIPTION

Figure 1:
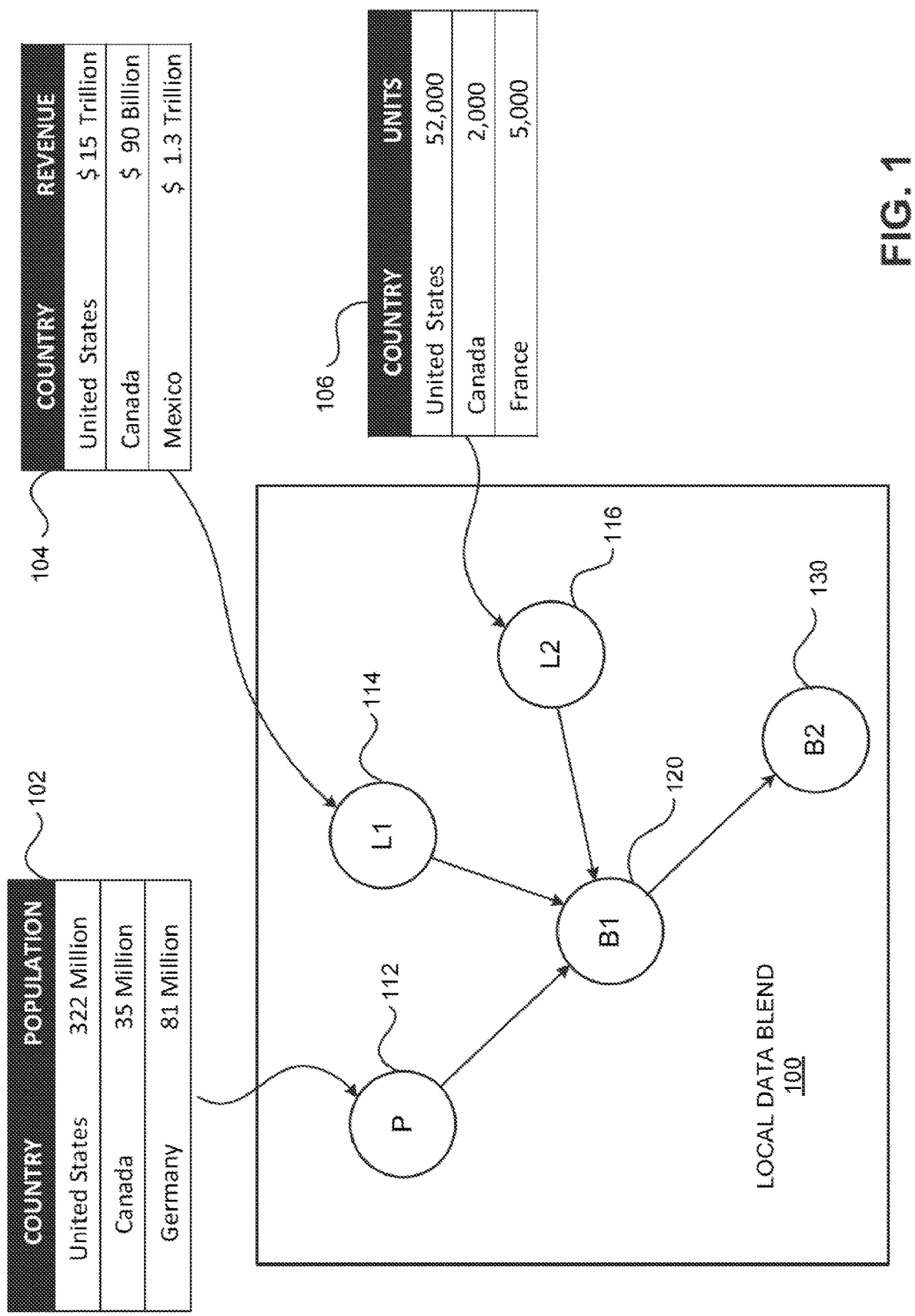
FIG. 1 illustrates in block diagram format an exemplary calculation graph generated during a local data blend operation.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

The various embodiments described herein relate to systems, methods, and computer readable media adapted for performing remote data blending operations. In general, a data blend operation may be performed on a user-specified subset of overall data sets. For example, a user may specify a data blend operation on two columns from a first data set and three columns from a second data set, rather than all columns from both data sets. Data blending is typically simpler or more streamlined than data merging, in that data blending enables users to specify a subset of the columns or rows within a database table (or other data structure) upon which the data blend is to be performed. The subsets can be specified based on the desired end result. While data merge operations typically operate on the entire database tables using all columns in all data sets, data blending can be viewed as ad hoc, utilizing only the columns or rows necessary for display in a particular visualization in a client interface at a client system.

It is unnecessary that both database tables that are blended together have the same fields. For example, if a first data set comprises two columns, "population" and "country", and a second data set comprises two columns, "country" and "revenue", a resulting join node may, for example, comprise a data structure with three columns: (1) "country", (2) "population" and (3) "revenue". The columns for "country" from both data sets can be collapsed into a single column and the data values in those columns can be aggregated together. The members for that blended column can be based on the designated join type, as discussed below.

Processing of data in a data blend operation may involve storing one or more result set data structure(s) in temporary storage locations during the life cycle of the blend operation—there is no requirement to store the resulting data set back to the database as required in data merge operations. A blended data structure (referred to herein as a "join node" or "join data structure") can be generated to perform the blending. A join node can comprise a result set data structure stored in local memory, for example. The result set data structures (e.g., tables) comprise runtime artifacts that occur during the data blending operation. The resulting set data structures are not artifacts of any database; hence there is no need to store the resulting data structure back to the database after a blend operation is complete. The results of data blend operations can be used to render one or more visualizations in a display at a client graphical interface. The result set data structures may comprise local in-memory tables created for the lifecycle of the query to obtain the requisite data for performing the data blend, and to provide a visualization of a particular visualization type specified by a user at a client interface.

Beginning with FIG. 1, an exemplary calculation graph generated during a local data blend operation is illustrated in block diagram format. The calculation graph may be utilized by a particular runtime process to perform data blending. Each node in a calculation graph may be generated by a calculation engine (not shown) in a backend server in communication with the client system. Each node may represent a database table (or other data structure), and each database table may comprise an SQL statement. Other database query languages are possible and the embodiments described herein are not limited to any particular one. Further, each node may include a reference to a previous node in the data blending process.

A calculation engine ("CE") in the backend server may generate a runtime artifact for each node in the calculation graph. In the illustrated embodiment, Local Data Blend graph 100 includes a plurality of nodes that all reside on the same machine or system. These nodes can include primary data set node P 112, local data set node L1 114, local data set node L2 116, blend node B1 120, and blend node B2 130. Primary data set node 112 comprises a table 102, local data set node L1 114 comprises a table 104, and local data set node L2 116 comprises a table 106. In this example, table 102 includes columns "country" and "population," and rows "United States," "Canada," and "Germany." Table 104 includes columns "country" and "revenue," and rows "United States", "Canada", and "Mexico." Table 106 includes columns "country" and "units," and rows "United States," "Canada," and "France."

For data blending, the two or more data sets to be blended can be aggregated and then blended together (also referred to herein as "joined"). Certain columns and rows in table 102 can be specified for data set node P 112, certain columns and rows in table 104 can be specified for data set node L1 114, and certain columns and rows in table 106 can be specified for data set node L2 116. In addition, one or more filters can be applied to the data set nodes P, L1, and L2 at the beginning of the data blending process as shown to perform various pre-filtering functions on the data sets.

The data blend calculation can be performed (e.g., by the calculation engine at the server) to join the data set nodes P, L1, and L2 at join or blend node B1 120. Additional functions may then be performed on the resulting data structure of blend node B1 120. For example, ranking or sorting functions can be performed. Further blending and data functions can be performed at additional join or blend nodes, such as blend node B2 130. The backend server can then build a database query to communicate to the database to retrieve a resulting data set.

Figure 2:
FIG. 2 illustrates in block diagram format an exemplary join node data structure generated during the local data blend operation of FIG. 1.

FIG. 2 illustrates in block diagram format an exemplary blend node data structure generated during the local data blend operation of FIG. 1. In this embodiment, blend node data structure 220 comprises a joined column 221 upon which the data blend operation has been performed. In this example, "country" in table 102 of data set node P 112 was specified as the column to blend on during the data blending operation. As used herein, the column specified for joining may also be referred to as the "linked column" or "blended column". As discussed above, it may not matter if the rows in the blended result include repeated values.

In one embodiment, the blend operation is adapted to collapse the columns from a primary data set with one or more joined (or linked) columns from one or more secondary data sets. The blend operation is then adapted to aggregate values of the rows in the blended column 221. In this example the "country" column of table 102 of data set node P 112 was specified as the column to be blended on. The primary data set was specified as data set node P 112 comprising table 102. Data set node L1 114 comprising table 104 therefore becomes a secondary data set that is blended with the primary data set P 112, and data set node L2 116 also becomes a secondary data set that is blended with the primary data set P 116. In particular, the data in the "country" column from table 104 of data set node L1 114, and the data in the "country" column from table 106 of data set node L2 116 are blended with the data in the "country" column from table 102 of data set node P 112 and then collapsed into the joined column 221.

The example illustrated in FIG. 2 depicts blending on a single column specified in the primary data set. It should be noted, however, that the any number of columns from the primary data set can be specified to blend on. In such a case, instead of collapsing the specified data sets into one column, the data sets would be collapsed into two or more columns because those were the columns specified for blending on.

The three tables 102, 104, and 106 from data set node P 112, data set node L1 114, and data set node L2 116, respectively, are joined at blend node B1 120. The additional columns "population" from table 102 of data set node P 112, "revenue" from table 104 of data set node L1 114, and "units" from table 106 of data set node L2 116 are also brought into the join node data structure 220. In this example, only the rows that exist in the primary data set in table 102 will be output as a result set of the data blend operation. In addition, where there are no values for a country in tables from the non-primary data sets, null values are returned. For example, because there were no "revenue" values for "Germany" in table 104, a null value is returned for this row in the join node data structure 220. Other types of data blending operations may also be performed, and it will be readily appreciated that the instant example is provided only for purposes of illustration.

Figure 3:
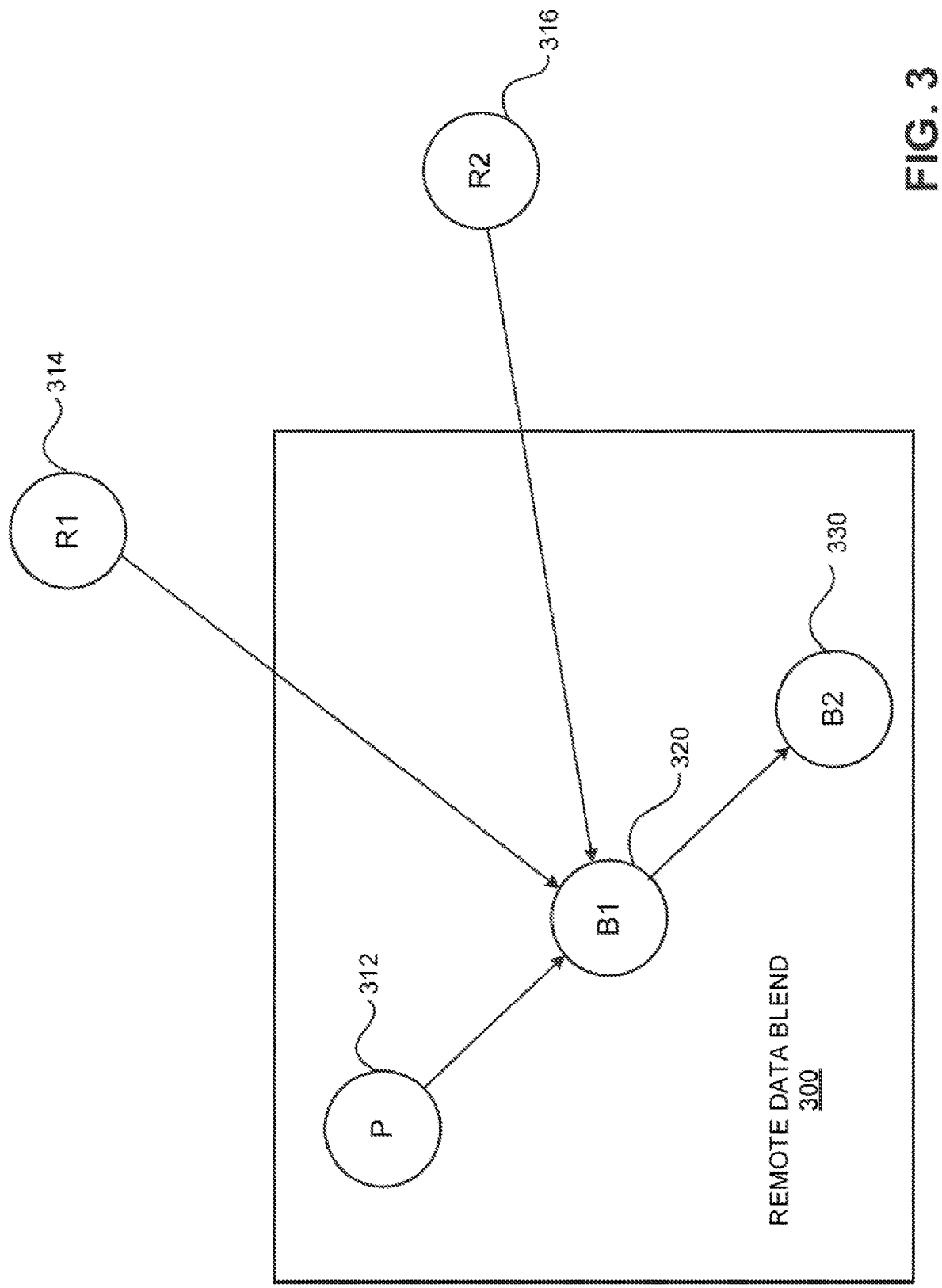
FIG. 3 illustrates in block diagram format an exemplary calculation graph generated during a remote data blend operation according to one embodiment of the present disclosure.

The foregoing example illustrates data blending operations that can take place where all data sets reside on the same machine or system. In cases where one or more data sets reside on separate or remote machines or systems, further processes are required to bring the data together in an efficient or streamlined fashion in order to perform data blending operations. Turning next to FIG. 3, an exemplary calculation graph generated during a remote data blend operation is illustrated in block diagram format. Remote Data Blend graph 300 can be similar to Local Data Blend graph 100, except that the data sets reside on different remote systems. Remote Data Blend graph can include primary data set node P 312, remote data set node R1 314, remote data set node R2 316, blend node B1 320, and blend node B2 330. Unlike in the previous example, remote data set nodes R1 314 and R2 316 reside on different systems than the primary data set node P312.

As shown in FIG. 3, data blending operations can be performed on different data sets that reside on different systems. While data blending operations can be relatively simpler when all data sets to be blended reside on the same system where the main data blending is to be performed, such as in the example provided above in FIG. 1, several difficulties can arise when at least one of the data sets to be blended is on a remote system from the primary data set (i.e., primary data set note P 312 in this example). Accordingly, features and advantages of the present disclosure include performing data blending operations on data sets that reside on different computer systems. For example, a main data blend operation may include additional information specifying where at least one data set to be blended is located on a remote system, and blending may include additional processing steps that perform subquery operations on the remote data set(s) at the remote data set location(s), transfer the appropriate subquery operation results in a streamlined and reliable fashion to the primary system, and then perform the main data blend operation on the results from all of the subquery operations at the primary system. These processes for remote data blending may take place on different systems or components that are distributed across a network, unlike a typical data blend operation that takes place all on the same system where all the data is stored, for example. As such, process flowcharts describing portions of the process from the perspective of these different components are provided below. This includes processes for a client system, a remote system, a primary system, and a data provisioning agent.

Figure 4:
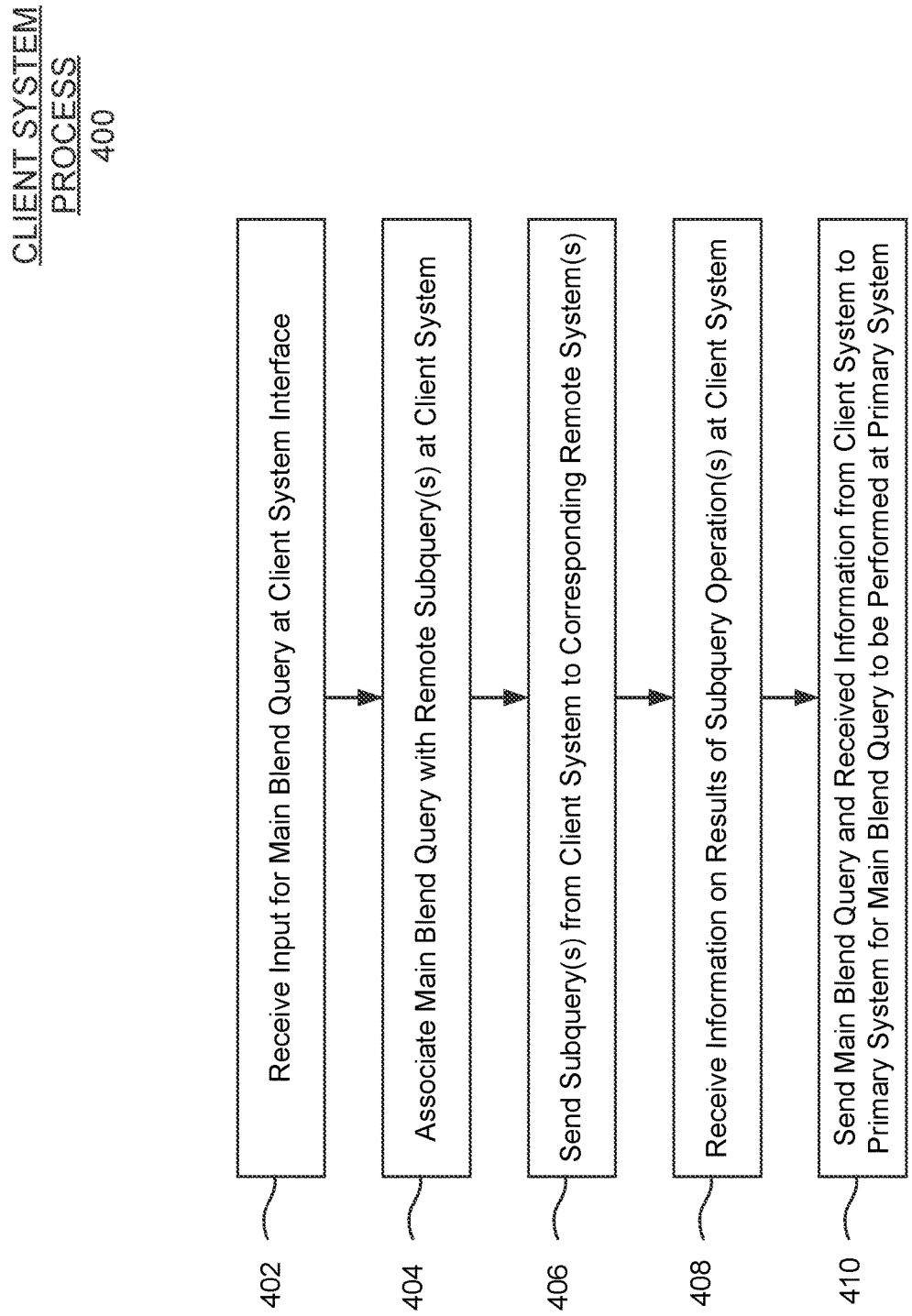
FIG. 4 provides a flowchart of a method of performing data blend functions from an overall data blend process at a client system according to one embodiment of the present disclosure.

FIG. 4 provides a flowchart of a method of performing data blend functions from an overall data blend process at a client system according to one embodiment of the present disclosure. The method set forth in FIG. 4 describes the processes that take place from the perspective of a client system involved in an overall main data blending process, and it will be appreciated that additional steps and features for the overall process take place at other system components. Process steps and features from the perspective of the client system are reviewed here first since the client system is where an overall data blend process typically begins.

At a first process step 402, input can be received at a client system interface for a main blend query. This can be by way of, for example, a user inputting on a client system interface a data blend request as well as various selections and/or parameters on how that data is to be blended. In general, a main blend query is an overall data blending operation that can be initiated by a user to be performed on data from different data sets. In the event that all of the required data sets reside on the same machine or system, then the overall data blending operation can be straightforward, such as that set forth in the example of FIG. 1 above.

In the event that at least one data set to be blended is located on a remote system, then further processes must take place to accommodate such an arrangement. At a subsequent process step 404, the main blend query can be associated with one or more remote subqueries. This can also involve generating the one or more remote subqueries, and such association and generation of remote subqueries may take place at the client system where the input for the main blend query is received, for example. In general, upon receiving the main blend query, it can be determined at the client system whether all of the required data sets reside on the same system, or whether at least one data set resides on a remote system. A primary system for performing the overall main data blend operation can be determined, and then a subquery is generated for each data set on each different remote system that is to be used for the overall main data blend operation. In general, a subquery is a part of the overall data blending operation that is to be performed on a given data set on a different remote system. For each remote data set that is to be used for the overall data blending operation, a remote subquery is generated and associated with that remote data set.

For example, a user may specify fields of different data sets to blend, and a main blend query may be generated by the client system. The main blend query may be disaggregated into subqueries based on the partitioning of the different data sets stored different systems, for example. Thus, multiple subqueries corresponding to different data sets on different systems are generated, where the combined subqueries produce data results that may be blended by the main blend query. In one embodiment, the client system may include a landscape definition specifying where different data sets are stored on different systems, including one or more remote systems and optionally the primary system where blending is to be performed, for example. For example, a user may have predefined access privileges to data on multiple remote systems and the primary system. Accordingly, when the user connects to different systems, a landscape definition is created and stored (e.g., in the client system). This landscape definition may include information specifying which systems the selected data sets reside on (e.g., URLs for remote systems and the primary system). In one embodiment, when the main blend query is disaggregated into subqueries, the subqueries and associated remote systems may be stored in a subquery location table to specify the location of subquery results. The client system uses the data location information from the landscape definition (e.g., in the subquery location table) to determine which data sets are stored where, determine which systems the subqueries should be sent to, and may further include subquery result location information in the main blend query so that the primary system knows where to access subquery results, for example, as described in more detail below.

At a following process step 406, the one or more remote subqueries are sent from the client system to the corresponding remote system or systems. Each remote subquery can then be performed on its respective remote data set residing on a remote system. The client system does not participate in the performance of such remote subqueries on the remote systems, further details for which are set forth below, particularly in FIG. 6 and the accompanying description thereof.

At the next process step 408, information on the results of the one or more remote subqueries is received at the client system. This information can include the actual full data results for each remote subquery, can include the results or partial results for each remote subquery in a serialized data format, and/or can include information on the location where the results for each remote subquery are stored, such that the primary system or another entity can use this information on stored location to facilitate retrieval of the remote subquery results.

At process step 410, the client system sends to the primary system the main blend query and the received information regarding the results of the one or more remote subqueries. The client system sends these items to the primary system such that the primary system is then able to perform the main blend query at the primary system based on the receipt of these items. Further details regarding process steps and features that take place at the primary system for the main blend query are provided below, particularly in FIG. 7 and the accompanying description therefor.

Figure 5:
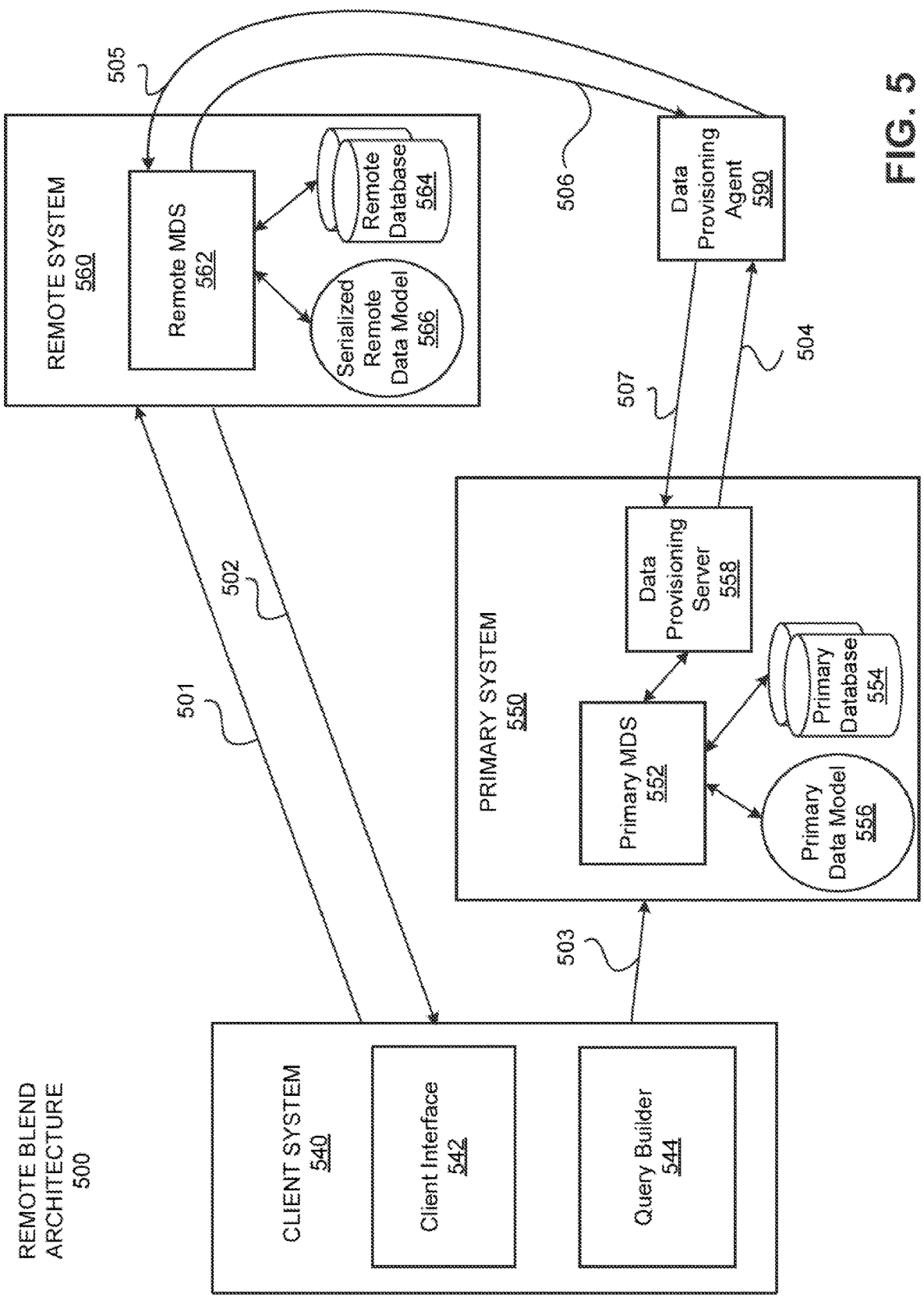
FIG. 5 illustrates in block diagram format an exemplary remote blend architecture having a client system, primary system, and one remote system according to one embodiment of the present disclosure.

Because these additional system components and processes are required to perform remote data blending operations, it will be readily appreciated that the overall system architecture for performing remote data blending is relatively more complex than that which is needed for data blending on a single system. FIG. 5 accordingly illustrates in block diagram format an exemplary remote blend architecture having a client system, primary system, and one remote system. Although the exemplary architecture provided in FIG. 5 includes only one remote system, it will be understood that multiple remote systems may also be used for remote data blending operations.

Remote blend architecture 500 can include a client system 540, a primary system 550, and a remote system 560. The client system may be a user's computer, such as a workstation, personal computer, or the like, having a processor, memory, input device (e.g., a keyboard and/or mouse), and an output device (e.g., a display), where the processor executes a client application for manipulating data including defining data blends of a plurality of data sets. The primary system and remote systems may be backend systems comprising a server computer and storage, where the server computer may execute a backend application including a database management system for storing and retrieving data sets, for example.

As noted above, the client system 540 is the system where a remote data blend operation is input or generated, the primary system 550 is where the main data blending operation (i.e., main remote blend query) is performed, and the remote system 560 is where at least one remote data set to be used in the data blending operation is located. Primary system 550 may also have a data set that is to be used in the data blending operation. A data provisioning agent 590 can also be used to facilitate the transmission of data subquery results from the remote system 560 to the primary system 550 where the main data blending operation is performed.

The client system 540 can include a client interface 542 and a query builder 544, among other possible components. The client interface 542 can be used to allow a user to input information regarding a desired main data blend operation. The query builder 544 can then use that input information to build a main data blend query as well as one or more subqueries forming portions of the main data blend query. Each subquery can be formed with respect to a data set residing on a system somewhere on the network. For example, a remote subquery can be built for a remote data set residing at the remote database 564 on remote system 560, while a primary subquery can be built for a primary data set residing at the primary database 554 on primary system 550. Further subqueries can also be built if additional data sets on additional remote system are needed to perform the overall main data blend query. Query builder 544 or another suitable component on client system 540 can be used to determine which data sets on the system are needed in order to perform the main data blend query, and where those data sets reside.

The primary system 550 can include a primary MDS (Multidimensional Data Services module) 552, a primary database 554, a primary data model 556, and a data provisioning server 558. The primary MDS 552 can be a multidimensional data services module configured to store and retrieve data from one or more data sets on the primary system 550. This can be done using one or more data sets that reside on primary database 554, in conjunction with the primary data model 556, which may be a multidimensional data cube, for example. A data provisioning server 558 can be used to facilitate the retrieval of data set results from other remote systems, as well as to reconstruct those retrieved data sets from a serialized cube format or other transmission format to a format suitable for performing full data blending operations. In one embodiment, the data provisioning server 558 receives data in a serialized data format together with metadata describing the format of the data on a remote system and reconstructs the data into a multidimensional cube for blending by execution of the main blended query by the MDS 552, for example.

The remote system 560 can include a remote MDS 562, a remote database 564, and a serialized remote data model 566. The remote MDS 552 can similarly be a multidimensional data services module configured to process data from one or more data sets on the remote system 560 using one or more data sets that reside on remote database 564. Unlike the primary data model 556 above, serialized remote data model 566 is used to facilitate processing of a remote data blend subquery somewhat differently. Rather than perform a subquery and return its results in a typical full format, serialized remote data model 566 is used to return results in a format that is more streamlined or "flattened," such that transmission of the results from the remote system to another system or network component is faster, easier, and more reliable. Such a serialized format can be a serialized "cube" format, as set forth in greater detail below.

An exemplary communication sequence between the various systems in remote blend architecture 500 is represented by transmission paths 501-507. In various embodiments, the communications between the various systems start with path 501 and continue in order through path 507. This communication order is provided for purposes of an example illustration.

Once subqueries are built, then client system 540 sends at least one remote subquery along path 501 to remote system 560 for processing at the remote system. After processing there, remote system 560 may send a response along path 502 indicating that the subquery is done and that a remote subquery result is available. In other embodiments, the remote system may send information along path 502 back to the client system 540 regarding the remote subquery results. In some embodiments, this information can include actual data from the remote subquery results. For example, in some embodiments the remote subquery result data is returned to client system 540 in a serialized data format together with metadata for reconstructing the data into a cube, for example. In some embodiments, this information can relate to where the remote subquery results are stored or located for a separate future access by another system component, such as primary system 550, for example.

Once the information regarding remote subquery results is received by the client system 540, then the client system 540 can send a communication to along path 503 to the primary system 550. This communication may include information on where the remote subquery results can be accesses, for example. Communication along path 503 may also include the main data blend operation itself, as well as any subqueries to be performed on data sets residing on the primary system 550, for example. In one embodiment, data regarding any subqueries to be performed on data sets residing on the primary system may also be sent to the primary system before the communication of information regarding the remote subquery results. Any such earlier communication from the client system 540 to the primary system 550 may also include the main data blend operation itself.

After receiving the communication from the client system 540, which communication can include the main data blend query, one or more subqueries for data sets residing on the client system, and information regarding the location of one or more remote subquery results, for example, the primary system 550 can process this communication and take steps to facilitate performance of the main data blend query. Processing the main data blend query may include retrieving the results of the one or more remote subqueries, which can be initiated by sending a request along path 504 from the primary system 550 to a data provisioning agent 590. This request can include information on where the results from the one or more remote subqueries can be retrieved. The data provisioning agent 590 can be configured to return remote subquery results after receiving such a request from the primary system 550. In some arrangements, remote subquery results can be located at the data provisioning agent 590 itself. In this case, then the data provisioning agent 590 can simply return the appropriate remote subquery results directly to the primary system 550 after receiving the request.

In some embodiments, as illustrated, the data provisioning agent 590 can use information in the request to retrieve the appropriate remote subquery results from where they are stored, such as from the remote system 560. As such, the data provisioning agent 590 then sends a request along path 505 to retrieve the requested remote subquery results from the remote system 560. This can be by way of communication with remote MDS 562, for example. The remote subquery results are then returned to the data provisioning agent 590 from the remote system 560 along path 506, after which the remote subquery results are sent from the data provisioning agent 590 to the primary system along path 507. Performance of the main data blend operation can then take place at primary MDS 552 on primary system 550 once all remote subquery results have been retrieved.

Figure 6:
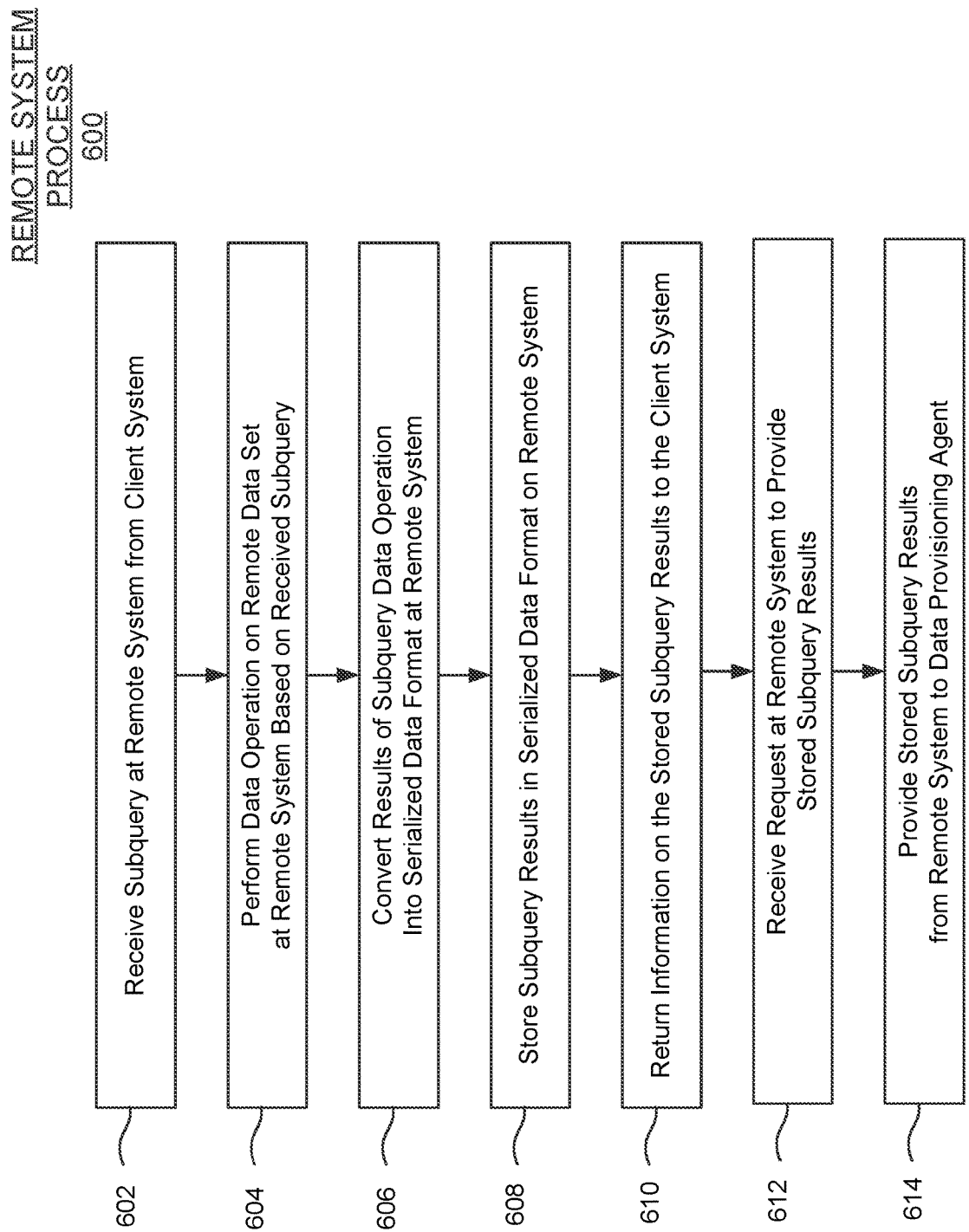
FIG. 6 provides a flowchart of a method of performing data blend functions from an overall data blend process at a remote system according to one embodiment of the present disclosure.

Moving next to FIG. 6, a flowchart of a method of performing data blend functions from an overall data blend process at a remote system is provided. The method set forth in FIG. 6 describes the processes that take place from the perspective of a remote system involved in an overall main data blending process, and it will be appreciated that additional steps and features for the overall process take place at other system components.

At a first process step 602, a remote subquery can be received at the remote system from the client system. This remote subquery can be a portion of what is needed for an overall main blend query that has been generated at the client system.

At a following process step 604, a data operation is performed on a remote data set residing on the remote system based on the received subquery. This can be a standard subquery performed on a given data set for purposes of an overall data blending process, and is called a remote subquery herein due to the data set being located on the remote system and the data operation performed on the data set taking place on that remote system.

At the next process step 606, the results of the remote subquery data operation can be converted into a serialized data format. Such a serialized data format can be the form of a temporary table. Again, this can be done in order to facilitate a more streamlined transmission of the results to another system or component on the network. In various embodiments, this serialized data format can be a "serialized data cube" format, details for which are provided below.

At process step 608, the remote subquery results in serialized data format can be stored for later retrieval. In some embodiments, the serialized data format subquery results can be stored on the remote system itself so that a data provisioning agent can retrieve the results at a later time, such as after a primary system sends a request to the data provisioning agent to retrieve the results. In some embodiments, the subquery results in serialized data format can be sent to the data provisioning agent after the remote subquery is performed and the format conversion is finished, such that the results can be stored at the data provisioning agent for later retrieval by the primary system. Alternatively, or in addition, the subquery results in serialized data format can be returned to the client system, such that the client system can forward the remote subquery results to the primary system. This may be preferable in situations where it is not desirable to have communications between the primary and remote systems, either directly or through the use of a data provisioning agent.

At a subsequent process step 610, information regarding the remote subquery results can be returned from the remote system to the client system. In some cases, this information can merely involve information indicating that the subquery is done. In some embodiments, the information regarding the remote subquery results can include the remote subquery results themselves being sent to the client system. This can involve the remote subquery results being transmitted to the client system while in a serialized data format.

In the event that the remote subquery results are stored at the remote system itself, process step 612 can involve receiving a request at the remote system to provide the stored subquery results from the remote system to the primary system. For example, in one embodiment process step 612 may be optional and may not be used in cases where the remote subquery results are automatically sent to a data provisioning agent, and/or cases where the remote subquery results are sent to the client system.

At process step 614, the stored remote subquery results can be provided from the remote system to the data provisioning agent, such as in response to a request from the data provisioning agent for the results. Again, the remote subquery results may be sent to the data provisioning agent for storage there automatically upon completion of the conversion to a serialized data format.

As noted above, performing a remote data blending operation on a remote data set can include a conversion to the results that provides a remote query result in the form of a "serialized cube," although other serialized data formats may also be used. In this example, a serialized cube is a converted data format for the remote data blend processing result, with the converted format being a more streamlined or "flattened" intermediate result or version that is more readily transmissible between systems over the network. The serialized data format can be saved as a flattened structure, such as to a table, such that it can be more readily transmitted between systems in that format, and can then be reconstructed into a full data set format after it is transmitted in order to perform blending operations with other full data sets after reconstruction.

The saved table where the serialized cube results are stored can be a temporary table, such that it can be deleted after the blending operations are completed. The serialized cube stored in table format can also have associated metadata that can be used to retrieve the results in serialized cube format. The associated metadata can also provide information regarding the particular structure of the serialized data, in order to help facilitate reconstruction of the results (e.g. into a data cube) at a different location after transmission for blending operations. In various embodiments, the main query and subqueries can be formed and sent in a JSON format, while the serialized cube results are in a different serialized format.

In various embodiments, the serialized cube data can be the processed intermediate result of data read from underlying database tables. Serialized cube data can contain dimension data and measure data. The data in a dimension may be repeated and can come from the same underlying database column. An example involving dimension data is set forth in Appendix A below. In this example, a "PRODUCTS" dimension has three attributes that all contain the values from the same database column, such that only the values for one attribute are sent.

Another example involving measure data is set forth in Appendix B below. For measure data unnecessary properties are not sent. For example, if the measure is an average calculation, then it may include average value, and may also contain a counter and a running total. In this example, only the average value is sent, since the calculation does not need to be rerun when performing blend operations. In addition, all values for one measure are grouped together for measure data. This can help to ensure that repeated values are grouped together, thus resulting in better compression for data transmission.

Figure 7:
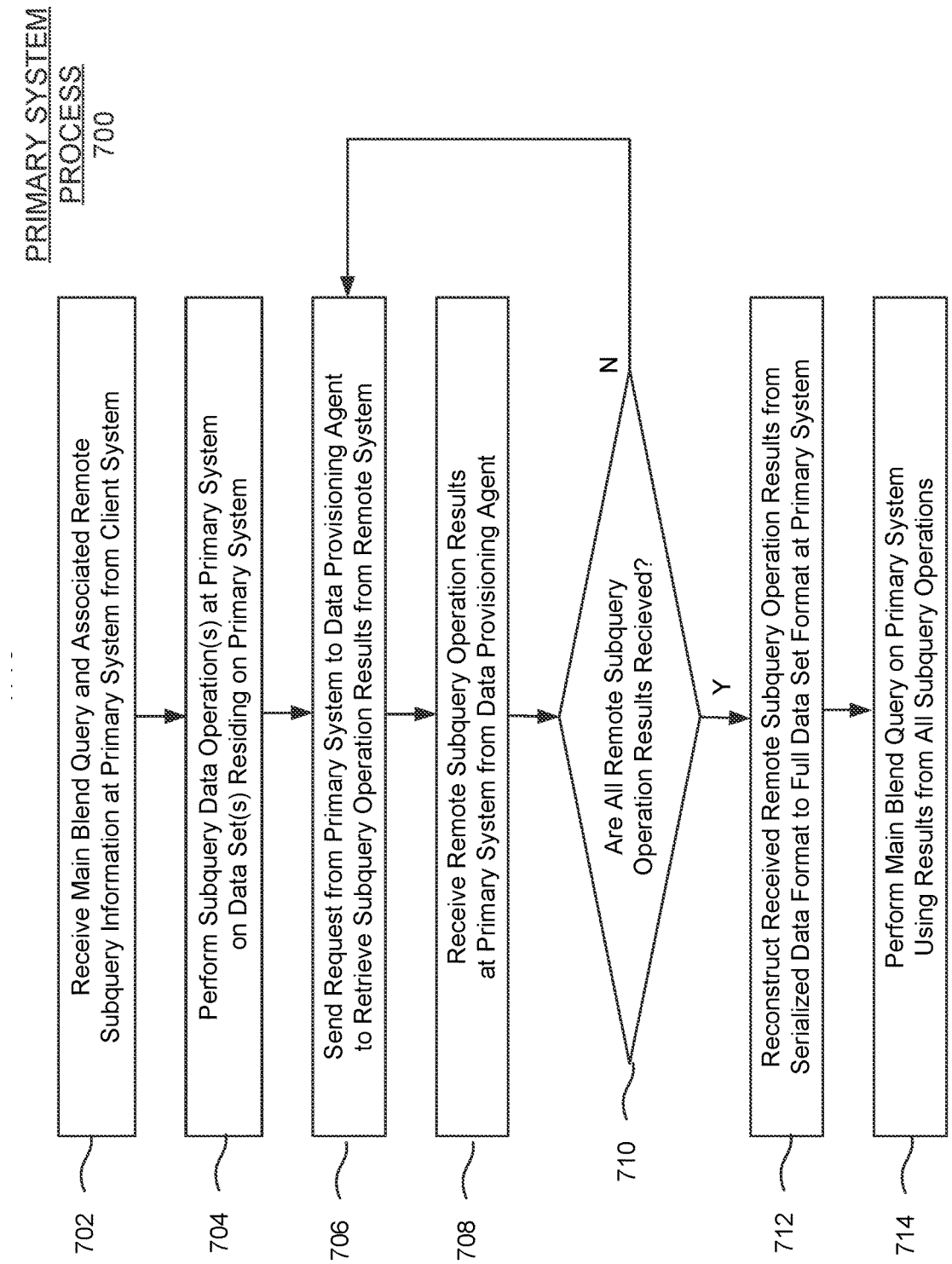
FIG. 7 provides a flowchart of a method of performing data blend functions from an overall data blend process at a primary system according to one embodiment of the present disclosure.

Continuing with FIG. 7, a flowchart of a method of performing data blend functions from an overall data blend process at a primary system is provided. The method set forth in FIG. 7 describes the processes that take place from the perspective of a primary system involved in an overall main data blending process, and it will be appreciated that additional steps and features for the overall process take place at other system components. Process steps and features from the perspective of the primary system are reviewed now, since they take place after the process steps set forth above with respect to the client system and the remote system.

At a first process step 702, information can be received at the primary system from the client system. This information can be in a communication regarding a main blend query generated at the client system. The received information can also include associated remote subquery information, as well as subquery information regarding subqueries to be performed at the primary system itself as part of the overall data blending operation. This receipt of information can take place all at once, or can take place on several occasions. For example, an initial communication of information might include only the main data blend query and any subquery to be performed at the primary system, while a later communication can include information regarding the remote subquery results.

At the next process step 704, one or more subquery data operations can be performed at the primary system on data set(s) residing on the primary system itself. Unlike the remote data operation on the remote system, the results of the subquery being performed at the primary system may not need to be converted into any serialized format. Since the main data blend operation will be performed at the primary system, any needed subquery result on a data set residing on the primary system can remain in its regular or full data format, and does not need to be converted into a serialized data format.

At process step 706, a request can be sent from the primary system to a data provisioning agent to retrieve the remote subquery data operation results from a remote subquery that has run on the remote system. This request sent from the primary system to the data provisioning agent can be based on the associated remote subquery information received from the client system. The request can include information relating to the remote system where the remote subquery was performed, metadata with respect to how the remote subquery has been converted into a serialized data format, and also information relating to where the remote subquery results are stored, among other informational items.

At a following process step 708, the requested remote subquery operation results can be received at the primary system from the data provisioning agent. As noted above, the remote subquery results can be in a serialized data format suitable for transmission between systems, such as a serialized data cube format. In some embodiments, the remote subquery results can be received at a data provisioning server located on the primary system, for example. Such a data provisioning server can be suitable for receiving and performing operations on results in a serialized data format. Decision step 710 can involve an inquiry as to whether all required remote subquery operation results have been received at the primary system. If only one remote subquery is being used, then this step 710 is not relevant. Where multiple remote subqueries are needed as part of the overall main remote data blending operation, however, then it is necessary for all of the remote subquery operation results to be received in order to perform the main data blend operation. In some instances, multiple remote subquery results can be received at the same time from the same data provisioning agent. In some embodiments, one or more data provisioning agents may return only a subset of all of the necessary remote subquery results. In such cases, where not all remote subquery results have been received, then the method can revert to process step 706 and repeat until all remote subquery results are received. In some embodiments where multiple remote subquery results are required, all requests for all such remote subquery results could be sent at process step 706, such that this step does not need to be repeated. In any event, the method does not continue to process step 712 until results from all remote subqueries have been received at the primary system.

At process step 712, the received remote subquery operation results can be reconstructed from a serialized data format to a full data set format that is more suitable for performing data blending operations (e.g., using the metadata corresponding to and describing a data format for each subquery result). Reconstructing subquery results may comprise converting the serialized data into a multidimensional data cube for each subquery result, for example. This may be done at a data provisioning server on the primary system, for example. It will be understood that this process step 712 may be performed for one or more received remote subquery results while the primary system is still waiting for other remote subquery results to arrive. Accordingly, process step 712 may precede decision step 710 in some cases. Once all remote subquery results have been received and have been reconstructed, then the method can continue to the final process step 714.

At process step 714, the main blend query can be performed on the primary system using the results from all of the subquery operations. This process step 714 can take place after all other steps have been performed. Performing the main blend query operation can include using the reconstructed results for each remote subquery, as well as the results from any subquery performed on the primary system for data set(s) that reside on the primary system itself. The results of the main blend query can then be returned to the user or generating entity, as will be readily appreciated.

Figure 8:
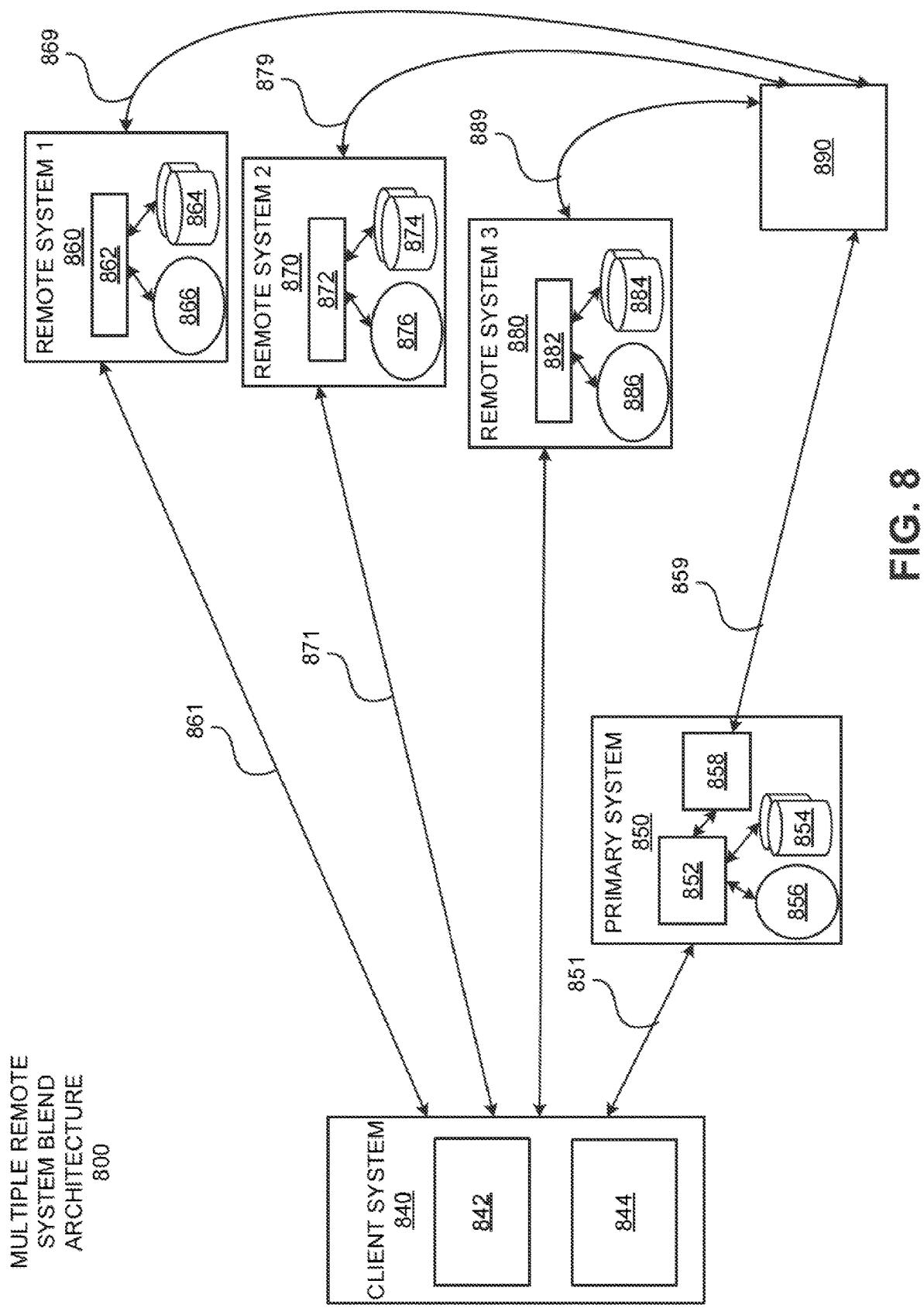
FIG. 8 illustrates in block diagram format an exemplary multiple remote system blend architecture having a client system, primary system, and multiple remote systems according to one embodiment of the present disclosure.

Transitioning now to FIG. 8, an exemplary multiple remote system blend architecture having a client system, primary system, and multiple remote systems is illustrated in block diagram format. Multiple remote system blend architecture 800 can be similar to remote blend architecture 500 above, only with several added remote servers. In particular, multiple remote system blend architecture 800 can include a client system 840, a primary system 850, and multiple remote systems 860, 870, 880. One or more data provisioning agent(s) 890 can also be used to facilitate the transmission of data subquery results from each remote system 860, 870, 880 to primary system 850 where the main data blending operation is performed. Although only one data provisioning agent 890 is shown in this illustrated example, it is possible to have multiple data provisioning agents. For example, there can be a separate data provisioning agent for each separate remote system. In such arrangements, the primary system 850 can be configured to communicate with multiple data provisioning agents, with appropriate considerations being implemented so that the primary system can know the right addresses for each separate data provisioning agent and which data provisioning agent corresponds to which remote system on the network.

Similar to the foregoing example above, the client system 840 can include a client interface 842 and a query builder 844. The client system 840 can be in communication with: remote system 1 860 by way of communication path 861; remote system 2 870 by way of communication path 871; remote system 3 880 by way of communication path 881, and primary system 850 by way of communication path 851. Communications between the client system 840 and each remote system 860, 870, 880 and primary system 850 can be substantially similar to that set forth in the single remote system example above.

The primary system 850 can similarly include a primary MDS 852, a primary database 854, a primary data model 856, and a data provisioning server 858. Each of these items can function in a substantially similar manner to the functions set forth above for these components in the single remote system example above. Although three remote systems are shown, it will be understood that fewer or more than three remotes systems may exist. Each remote system can include its own remote MDS, remote database, and serialized remote data model. For this particular example, remote system 1 860 has its own remote MDS 862, remote database 864, and remote serialized data model 866; remote system 2 870 has its own remote MDS 872, remote database 874, and remote serialized data model 876; and remote system 3 880 has its own remote MDS 882, remote database 884, and remote serialized data model 886. Each of these items can function in a substantially similar manner to corresponding remote system items from exemplary system 500 above.

Primary system 850 can be in communication with data provisioning agent 890 by way of communication path 859, while the data provisioning agent 890 may be in communication with remote system 1 860 by way of communication path 869, with remote system 2 870 by way of communication path 879, and with remote system 3 880 by way of communication path 889. As noted above, more than one data provisioning agent may also be present, with various additional communication paths existing between each data provisioning agent and primary system 850, as well as between each data provisioning agent and one or more of the remote systems. It will be understood that many more remote systems and/or data provisioning agents may be present in a given multiple remote system blend architecture, and that the various processes, functions, communication patterns, and other features inherent to such additional items can be readily extrapolated from the illustrative examples provided herein.

Figure 9:
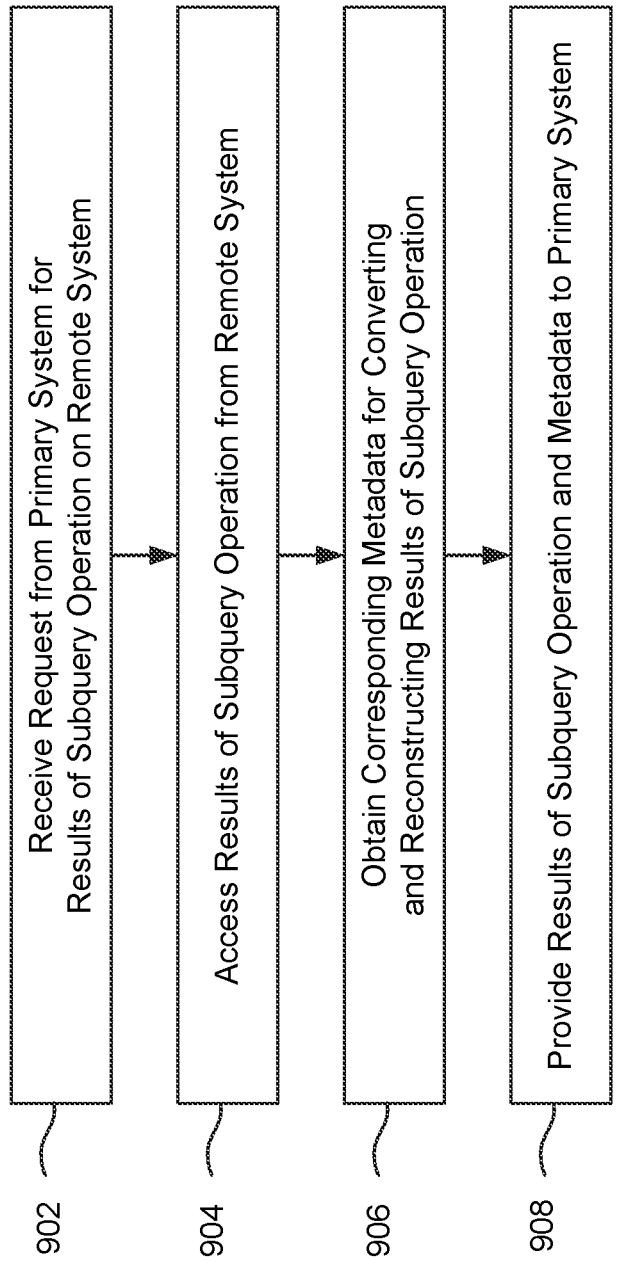
FIG. 9 provides a flowchart of a method of performing data blend functions from an overall data blend process at a data provisioning agent according to one embodiment of the present disclosure.

FIG. 9 provides a flowchart of a method of performing data blend functions from an overall data blend process at a data provisioning agent according to one embodiment of the present disclosure.

Continuing now with FIG. 9, a flowchart of a method of performing data blend functions from an overall data blend process at a data provisioning agent is provided. The method set forth in FIG. 9 describes the processes that take place from the perspective of a data provisioning agent involved in an overall main data blending process, and it will be appreciated that additional steps and features for the overall process take place at other system components. Process steps and features from the perspective of the data provisioning agent are reviewed last, since they take place after much of the process steps set forth above with respect to the client system, the remote system, and the primary system. In general, only the final main data blend query operation taking place at the primary system occurs after activity by each of the one or more data provisioning agents.

At a first process step 902, a request from the primary system can be received at the data provisioning agent for results of a remote subquery operation on a remote system. Although multiple requests for multiple remote subquery operation results can be received by a given data provisioning agent, only a single request is discusses here for purposes of illustration. The same steps set forth here can be applied again for each request for remote subquery operation results.

At a following process step 904, results of the remote subquery operation from the corresponding remote system can be accessed by the data provisioning agent. In some embodiments, this can involve sending a request from the data provisioning agent to the appropriate remote system in order to get the requested remote subquery results. In other embodiments, the requested remote subquery results may already be stored at or otherwise exist at the data provisioning agent. In either case, the results of the requested remote subquery can be accessed.

At the next process step 906, the corresponding metadata from converting and reconstructing the results of the remote subquery operation can be obtained by the data provisioning agent. This metadata can be included in the original received request, for example, with such metadata being communicated from the primary system, which received the metadata from the client system, which received the metadata from the corresponding remote system when that information was sent to the client system after the remote subquery was performed.

At a following process step 908, the results of the remote subquery operation and the appropriate metadata therefor can be provided from the data provisioning agent to the primary system. Metadata, identifying information, and other suitable information can be included with the provided results, such that the primary system is able to identify which remote subquery results it is receiving, and is able to reconstruct the received results from a serialized data format to a full data format in order to perform the main data blending query using the received data.

Hardware

Figure 10:
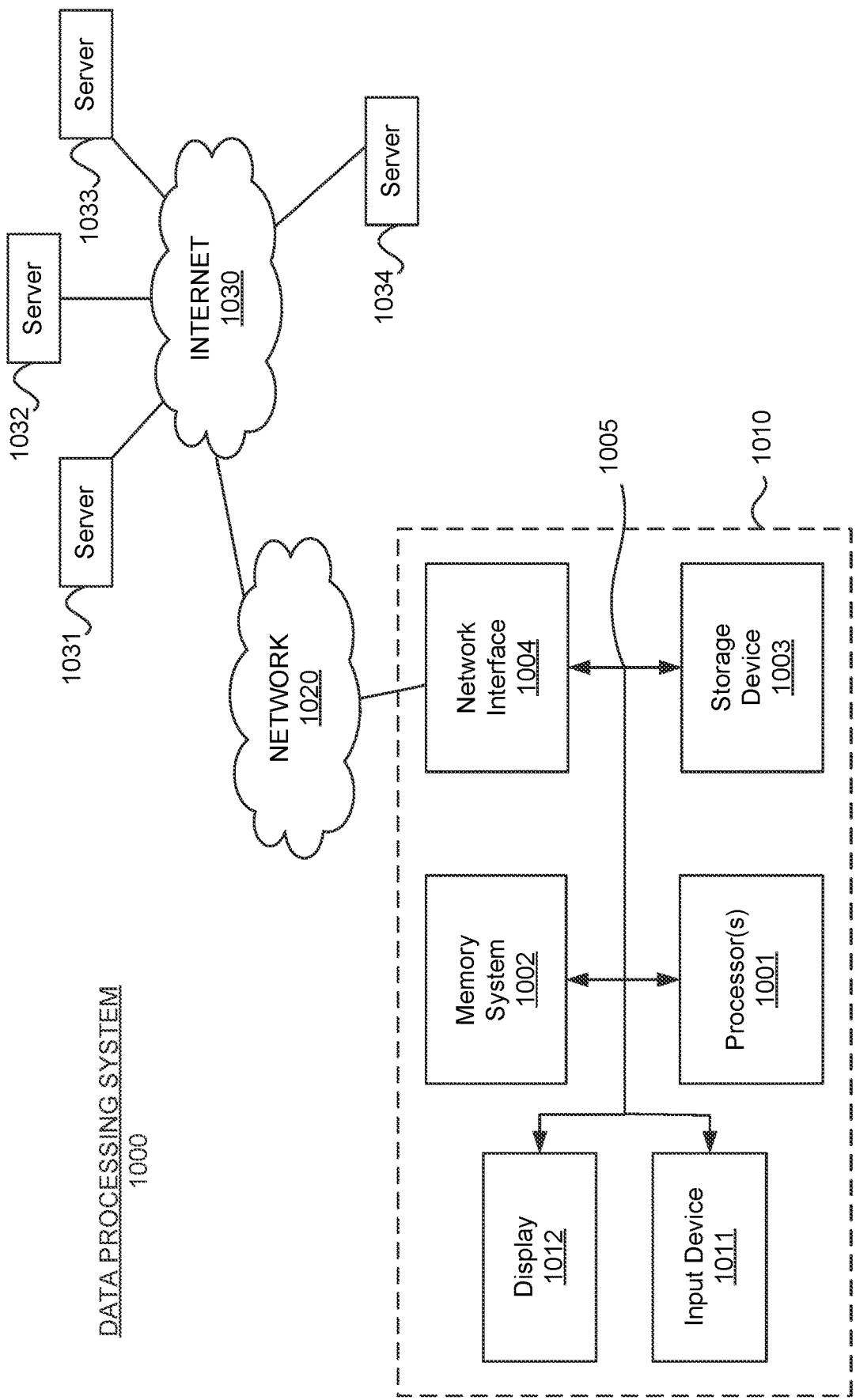
FIG. 10 illustrates in block diagram format an exemplary hardware arrangement of a special purpose computing machine configured to perform a remote data blend operation according to one embodiment of the present disclosure.

FIG. 10 illustrates hardware of a special purpose computing machine configured to perform a remote data blend operation according to the above disclosure. The following hardware description is merely one example. It is to be understood that a variety of computers topologies may be used to implement the above described techniques. An example data processing system 1000 is illustrated in FIG. 10. Computer system 1010 includes a bus 1005 or other communication mechanism for communicating information, and one or more processor(s) 1001 coupled with bus 1005 for processing information. Computer system 1010 also includes a memory 1002 coupled to bus 1005 for storing information and instructions to be executed by processor 1001, including information and instructions for performing some of the techniques described above, for example. This memory may also be used for storing programs executed by processor(s) 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1003 may include source code, binary code, or software files for performing the techniques above, for example. Storage device and memory are both examples of non-transitory computer readable storage mediums.

Computer system 1010 may be coupled via bus 1005 to a display 1012 for displaying information to a computer user. An input device 1011 such as a keyboard, touchscreen, and/or mouse is coupled to bus 1005 for communicating information and command selections from the user to processor 1001. The combination of these components allows the user to communicate with the system. In some systems, bus 1005 represents multiple specialized buses, for example.

Computer system 1010 also includes a network interface 1004 coupled with bus 1005. Network interface 1004 may provide two-way data communication between computer system 1010 and a network 1020. The network interface 1004 may be a wireless or wired connection, for example. Computer system 1010 can send and receive information through the network interface 1004 across a local area network, an Intranet, a cellular network, or the Internet 1030, for example. In the Internet example, a browser, for example, may access data and features on backend systems that may reside on multiple different hardware servers 1031-1034 across the network.

ILLUSTRATIVE IMPLEMENTATION EXAMPLES

The following are implementation examples. Such detailed example should not be so construed as to limit the claims below. Referring again to FIG. 3, a local versus remote blending of data sets are illustrated. Local-ness and remote-ness are relative to the database (e.g., a HANA machine) that is performing the blending. For the purposes of the following examples, databases are illustrated using a HANA® machine by SAP®, but it is to be understood that other database technologies could be used. Embodiments of the disclosure allow users to blend data sets located on different HANA machines or other databases, for example.

Remote Blending may be performed on the machine where the primary data set resides. Local-ness and remoteness are relative to HANA machine that is performing the blending. The reason is Primary data set's hierarchy. For example, some database models are considered "local" if blending is performed in an on-premise database.

Referring again to FIG. 5, a remote blending architecture is illustrated. In this example, a new connection may be formed between the cloud and on prem systems. In order to achieve remote blending, the architecture may connect the HANA machines together. Embodiments may use HANA's Smart Data Integration (SDI) technology to connect SAC HANA in the cloud with an on-premise HANA. The SDI connection may include a SDI Agent installation on-premise. One Agent can connect multiple HANA machines with cloud HANA, for example. This architecture may not need yet another complicated single-sign-on setup.

Users may use their existing authentication protocol. The user may log into SAP Analytics Cloud, for example, using any supported authentication protocol. The user can also authenticate with on-premise HANA using "any" supported authentication mechanism.

Authorization and authentication is exactly the same for blending in the on-premise server, versus in the cloud. The order to execution may be different. You can blend any HANA model with any HANA model, for example. It is also possible to connect two on-premise servers together, for example.

Before agent installation, create a technical user in HANA. This user may have JDBC access to your HANA, and a password, for example. It may only need to be able to write or read from/to a single table in its own schema (e.g., no other privileges may be required). SAC Cloud Ops, or UI will provide you with the following information: Cloud HANA host name, Cloud HANA port number, SSL/HTTPS proxy host name (optional), proxy port number, and set of credentials to register your Agent with the cloud HANA instance which is basically a cloud technical user name and password, for example.

A user enters their technical user name and password into the cloud HANA. The on-premise user credential will be stored by SDI in HANA secure store in the cloud. SDI Agent is the part to install on-premise. A user may be created with a GUID username that is hard to guess, for example. This user may have JDBC access to its own schema only.

A serialized cube is kept for some period of time. It is cleaned up after some configurable period of time by MDS. If secondary query is not changed, then further blending can be performed on the same serialized secondary cube(s). Change in secondary query is adding another dimension for example.

The Cube is the processed intermediate result of data read from the underlying database tables. Cube data may contain dimension and measure data.

Dimension Data

The data in a dimension may be repeated and come from same underlying database column. For example, in the snippet below the PRODUCTS dimension has 3 attributes that are all contain the values from the same database column so only the values for 1 attribute is sent and the [PRODUCTS_AT].key and PRODUCT_ID values are reconstructed from PRODUCTS_AT. See example in Appendix A.

The data is encoded in columnar format rather than row format. So we would encode all the PRODUCT information, then the YEAR.

So, in this case "034118, 035979" and then "2011, 2012". Rather than "034118, 2011", "034118, 2012", etc. . . .

Measure Data

For the measure data unnecessary properties are not sent. For example, if the measure is an average calculation then besides the average value it may contain a counter and a running total (total/counter=average). In this case only the average value is sent because the calculation does not need to be re-run when performing the blend on the remote system.

Also for the measure data, all values for one measure are grouped together. This helps ensure repeated values are grouped together resulting in better compression. As a simplified example, in the attached subquery json QMDS0957b the data for SoldQty (entity "0") is returned as shown in Appendix B, for example.

Also, the dec_float_value_high field is byte swapped as this allows better compression.

Measure Duplicate Elimination

A measure has associated property values as seen in the example. If the property values are the same for all measure values then they are only returned once. In the result for the subquery SoldQty has 2 values. This is denoted by the 2 entries in dimension_tuples. The only difference in SoldQty is dec_float_value_low. All the remaining property values are identical and only encoded once. The algorithm to encode the data iterates over the cube data once to encode it for transfer to the remote system. For example:

```
previousCell = null
foreach (cell in Cube)
    foreach (property in cell)
        if previousCell = null
            output.property.push_back(property)
        if property != previousCell.property
            if output.property.count = 1
                fill output.property with previousCell.property
            output.property.push_back(property)
    previousCell = cell
```

On decoding side when performing the blend if the decoder sees that a property has only 1 value then every measure gets the same value for that property.

Information Access ("InA") Change for Remote Blending

Two proposed ways to transfer intermediate results between systems are via tables (using SDA/SDI virtual tables) and in JSON results via the browser.

Remote Blending InA Workflow (via table)—A sub query is sent to the remote server. The remote server stores the serialized data (View and Cube) in a table. A blending query is sent to the local server. The local server reads remote data from a table.

InA Change for the Sub Query—To let the remote server know that we want to store the serialized data, there are some changes made to InA. For example:

```
"ResultSetFeatureRequest": {
    "ResultFormat": "SerializedData",
    "ResultSetPersistanceIdentifier": "IamIdentifier",
    "ResultSetPersistanceSchema": "IamSchemaName",
    "ResultSetPersistanceTable": "IamTableName",
    "ResultSetPersistanceVersion": VersionNumber
}
```

In the already existing "ResultSetFeatureRequest" element, one example implementation is adding a new value for the existing "ResultFormat" element: "SerializedData"; adding a new element called "ResultSetPersistanceIdentifier" where we can specify an identifier for the stored data; reusing the existing "ResultSetPersistanceSchema" and "ResultSetPersistanceTable"; adding a new element called "ResultSetPersistanceVersion" where the serialized data version can be set. If this parameter is not provided then the highest version MDS supports will be serialized. (2018-03-13), for example. When the "ResultFormat" is set to "SerializedData", MDS will store the serialized data into the provided "ResultSetPersistanceSchema"."ResultSetPersistanceTable" with an identifier from "ResultSetPersistanceIdentifier". For Analytics queries no grid is returned if the result is serialized to a table. For Metadata queries the "Cube" metadata is returned if the result is serialized to data.

InA Change for the Blending Query

To let the local server know that we want to use the serialized data, there are some changes made to InA. For example:

```
"DataSource": {
    "SchemaName": "MDS",
    "ObjectName": "REMOTE_OBJECTS",
    "Type": "SerializedData",
    "InstanceId": "IamIdentifier"
}
```

A new type called "SerializedData" is added but we are reusing the existing elements. In above case, MDS will read the serialized data from "MDS"."REMOTE_OBJECTS" table with an identifier, "IamIdentifier".

Remote Blending InA Workflow (Via JSON)

A sub query is sent to the remote server. The serialized data (View and Cube) is returned as a base64 string in the JSON sub query response. Client system application FireFly will extract the base64 string from the sub query response and insert it into the sub query "DataSource" within the blend query. A blending query is sent to the local server. The local server reads remote data from the base64 string within the blend query.

InA Change for the Sub Query

To let the remote server know that we want to return the serialized data via the JSON response the table and schema are not necessary. For example:

```
"ResultSetFeatureRequest": {
    "ResultFormat": "SerializedData"
    "ResultSetPersistanceVersion":VersionNumber
}
```

In the already existing "ResultSetFeatureRequest" element we are re-using the "ResultFormat" elements from the SDI workflow. When the "ResultFormat" is set to "SerializedData", MDS will return the serialized data in the JSON response if "ResultSetPersistanceIdentifier", "ResultSetPersistanceSchema" and "ResultSetPersistanceTable" are not provided.

InA Change for Sub Query JSON Response

For "Analytics" sub queries the response does not contain a grid but the base64 serialized cube and view.

```
{
    "DataSource": {
        "Type": "View",
        "SchemaName": "LIQUID_SQE",
        "PackageName": "",
        "ObjectName": "PRODUCTS",
        "InstanceId": "5A2FC92A38CC0807E200C67A7ECB6611",
        "Alias": ""
    },
    "SerializedData": {
        "View": "BASE64_OF_VIEW",
        "Cube": "BASE64_OF_CUBE"
    },
    "PerformanceData": { .... }
}
```

In the response, we are adding a new element called "SerializedData" that contains two new elements "View" and "Cube" representing the base64 serialized data, and reusing the existing "DataSource" and "PerformanceData." For "Metadata" sub queries the response will be modified to include the base64 view. The existing "Cube" element metadata is returned with the addition of a new "SerializedData" element with one new element "View" representing the base64 serialized data.

```
{
    "Cube": {
        "CatalogPackage": "bics.variables",
        "CatalogSchema": "_SYS_BIC",
        ...
        "SerializedData": {
            "View": "BASE64_OF_VIEW"
        },
        ...
    },
    "PerformanceData": { .... }
}
```

InA Change for the Blending Query

An Analytics blend query will contain the base64 serialized data with the "DataSource" element for the sub query source. For example:

```
"DataSource": {
    "Type": "SerializedData",
    "InstanceId": "IamIdentifier",
    "SerializedData": {
        "View": "BASE64_OF_VIEW",
        "Cube": "BASE64_OF_CUBE"
    }
}
```

A new element called "SerializedData" is added that contains two new elements "View" and "Cube" representing the base64 serialized data. The base64 data is the same that was returned in the InA response. For "Metadata" blend queries the "SerializeData" element will only contain a "View" element. For example:

```
"DataSource": {
    "Type": "SerializedData",
    "InstanceId": "IamIdentifier",
    "SerializedData": {
        "View": "BASE64_OF_VIEW",
    }
}
```

Primary Blending Subquery Caching

In order to parallelize the execution of the primary (local) subquery, and the secondary (remote) blending subquery, a query cube cache will be introduced to allow the primary blending subquery to be executed and its cube stored for later usage during the remote blend execution. However, as the primary blending subquery will be executed outside the context of a blend when it is first executed and cached, a field must be provided to indicate that the execution of the query is that of a blending subquery. In the context of a blending query, additional dimensions are added and present in the cube as they are required by the blend. Providing the context of a blending subquery through the InA, the primary blending subquery is processed in the same way as in the general blending case. The context is provided via the boolean field "isCubeBlendingSubquery" of the "ResultSetFeatureRequest" element of the InA. For example:

```
"ResultSetFeatureRequest": {
    "IsCubeBlendingSubquery": true
}
```

Remote Blending Version Negotiation

As MDS changes, the version of the serialized data can change and MDS has no way of knowing which version it should serialize. In order to solve this problem, MDS will return in its GetServerinfo Capabilities which versions it supports. Client system application, Firefly, may look at the capabilities of all machines involved in the blend and determine the maximum version that is supported by all machines and put that version in to the "ResultSetFeatureRequest" in "ResultSetPersistanceVersion": X For example:

Machine 1:

```
{"Capabilities":[{"Capability":"RemoteBlendingVersionSelection"},
{"Capability":"SerializedDataV2"},{" Capability":"SerializedDataV3"}]}
```

Machine 2:

```
{"Capabilities":[{"Capability":"RemoteBlendingVersionSelection"},
{"Capability":"SerializedDataV3"},{"Capability":"SerializedDataV4"}]}
```

In this case it should put "ResultSetPersistanceVersion": 3

In the case where no "RemoteBlendingVersionSelection" capability is sent then Firefly should assume that the version only version it supports is version 1.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

Example dimension data model:
```
"members": {
    "reference_columns": [
        {
            "reference_name": "PRODUCTS_AT",
            "column_name": "[PRODUCTS_AT].key"
        },
        {
            "reference_name": "PRODUCTS_AT",
            "column_name": "PRODUCT_ID"
        }
    ],
    "columns": [
        {
            "values": [
                "034118",
                "035979"
            ],
            "column_type": "VALUE_CLASS_STRING",
            "column_name": "PRODUCTS_AT"
        }
    ]
}
```

APPENDIX B

Example measure data model:
```
"entities": {
    "0": {
        "value_exception_type": [
            "VALUE_EXCEPTION_NORMAL"
        ],
        "dec_float_value_high": [
            "14896"
        ],
        "dec_float_value_low": [
            "2515000",
            "4444000"
        ],
        "dimension_tuples": [
            {
                "tuple": [
                    0,
                    1
                ]
            },
            {
                "tuple": [
                    1,
                    1
                ]
            }
        ],
        "aggregation": [
            "AGGREGATION_SUM"
        ],
        "digits_shift": [
            0
        ],
        "value_class": [
            "VALUE_CLASS_DECFLOAT"
        ],
        "int_digits": [
```

APPENDIX B-continued

```
        31
    ],
    "fract_digits": [
        3
    ]
  }
}
```

What is claimed is:

1. A method, comprising:
receiving input at a client system in communication with a primary system and with one or more remote systems, a user of the client system having predefined access privileges to data on the primary system and the one or more remote systems, the primary system having at least one data set and the one or more remote systems having separate data sets, wherein the input specifies a main data model blend query for a main data model blend that blends data from separate data sets at the primary system and at least one of the one or more remote systems;
storing, at the client system, a landscape definition specifying where different data sets are stored on the one or more remote systems, the landscape definition including URLs for each corresponding remote system;
generating, at the client system, one or more subqueries from the main data model blend query, wherein each subquery corresponds to a different remote system having a remote system data set that is to be blended in the main data model blend, wherein the client system uses data location information from the landscape definition to determine which of the different remote systems to send each of the one or more subqueries to;
sending, from the client system, each of the one or more subqueries to a corresponding remote system of a plurality of corresponding remote systems for execution on the remote system data set at the corresponding remote system;
receiving, at the client system from each corresponding remote system, information regarding a respective set of subquery results from executing the respective subquery on the remote system data set at the corresponding remote system, the information regarding the respective set of subquery results including a location in the corresponding remote system where the subquery results are stored, and each corresponding remote system providing the information regarding the respective set of subquery results after executing the respective subquery, wherein the landscape definition specifies locations in the corresponding remote systems where subquery results are stored using the information regarding the respective set of subquery results received from each corresponding remote system; and
sending, from the client system to the primary system, the main data model blend query, wherein the main data model blend query comprises the location in the corresponding remote system for each corresponding remote system, wherein client system uses the data location information from the landscape definition to include the location in the main data model blend query, wherein the primary system retrieves the subquery results from the location included in the received information and blends the subquery results.

2. The method of claim 1, further comprising:
retrieving at the primary system each set of subquery results from its corresponding remote system using the location in the corresponding remote system; and
performing a data blend operation at the primary system based on the main data model blend query and the retrieved sets of subquery results from each of the remote systems.

3. The method of claim 1, wherein a data provisioning agent facilitates communication between the primary system and at least one of the corresponding remote systems, the data provisioning agent being separate from the client system.

4. The method of claim 1, further comprising:
executing each of the one or more subqueries on a remote system data set at the subqueries' corresponding remote system to provide a set of subquery results; and
storing each set of subquery results on each respective corresponding remote system.

5. The method of claim 4, wherein each set of subquery results is stored in a serialized data format.

6. The method of claim 5, further comprising receiving, in the primary system, metadata describing each subquery result.

7. The method of claim 6, wherein the metadata is configured to allow a reconstruction of the subquery results from the serialized data format to a cube format for data blending operations on the primary system.

8. The method of claim 1, further comprising:
sending from the client system to the primary system a subquery for execution on a primary data set at the primary system, wherein the results of the subquery to be performed at the primary system are not to be converted into a serialized data format.

9. The method of claim 1, wherein the information regarding a set of subquery results comprises information that the subquery results are done.

10. The method of claim 1, further comprising generating, on the client system, a table associating each subquery with a particular remote system.

11. The method of claim 1, wherein the received information includes the set of subquery results.

12. The method of claim 11, wherein the client system sends to the primary system each set of subquery results, and wherein no communication takes place between the primary system and any of the one or more remote systems.

13. The method of claim 1, wherein the sending of the main data model blend query comprising the location in the corresponding remote system is performed once the information regarding the respective set of subquery results including the location is received from each corresponding remote system.

14. A non-transitory machine-readable medium storing a program executable by at least one processing unit of a device, the program comprising sets of instructions for:
receiving input at a client system in communication with a primary system and with one or more remote systems, a user of the client system having predefined access privileges to data on the primary system and the one or more remote systems, the primary system having at least one data set and the one or more remote systems having separate data sets, wherein the input specifies a main data model blend query for a main data model blend that blends data from separate data sets at the primary system and at least one of the one or more remote systems;

storing, at the client system, a landscape definition specifying where different data sets are stored on the one or more remote systems, the landscape definition including URLs for each corresponding remote system;

generating, at the client system, one or more subqueries from the main data model blend query, wherein each subquery corresponds to a different remote system having a remote system data set that is to be blended in the main data model blend, wherein the client system uses data location information from the landscape definition to determine which of the different remote systems to send each of the one or more subqueries to;

sending, from the client system, each of the one or more subqueries to a corresponding remote system of a plurality of corresponding remote systems for execution on the remote system data set at the corresponding remote system;

receiving, at the client system from each corresponding remote system, information regarding a respective set of subquery results from executing the respective subquery on the remote system data set at the corresponding remote system, the information regarding the respective set of subquery results including a location in the corresponding remote system where the subquery results are stored, and each corresponding remote system providing the information regarding the respective set of subquery results after executing the respective subquery, wherein the landscape definition specifies locations in the corresponding remote systems where subquery results are stored using the information regarding the respective set of subquery results received from each corresponding remote system; and sending, from the client system to the primary system, the main data model blend query, wherein the main data model blend query comprises the location in the corresponding remote system for each corresponding remote system, wherein client system uses the data location information from the landscape definition to include the location in the main data model blend query, wherein the primary system retrieves the subquery results from the location included in the received information and blends the subquery results.

15. The non-transitory machine-readable medium of claim 14, further comprising:
retrieving at the primary system each set of subquery results from its corresponding remote system using the location in the corresponding remote system; and
performing a data blend operation at the primary system based on the main data model blend query and the retrieved sets of subquery results from each of the remote systems.

16. The non-transitory machine-readable medium of claim 14, further comprising:
executing each of the one or more subqueries on a remote system data set at the subqueries' corresponding remote system to provide a set of subquery results; and
storing each set of subquery results on each respective corresponding remote system.

17. The non-transitory machine-readable medium of claim 14, wherein the sending of the main data model blend query comprising the location in the corresponding remote system is performed once the information regarding the respective set of subquery results including the location is received from each corresponding remote system.

18. A computer system comprising:
one or more processors;
at least one memory; and
computer program code comprising instructions, executable on said one or more processors, the computer program code configured to:

receive input at a client system in communication with a primary system and with one or more remote systems, a user of the client system having predefined access privileges to data on the primary system and the one or more remote systems, the primary system having at least one data set and the one or more remote systems having separate data sets, wherein the input specifies a main data model blend query for a main data model blend that blends data from separate data sets at the primary system and at least one of the one or more remote systems;

store, at the client system, a landscape definition specifying where different data sets are stored on the one or more remote systems, the landscape definition including URLs for each corresponding remote system;

generate, at the client system, one or more subqueries from the main data model blend query, wherein each subquery corresponds to a different remote system having a remote system data set that is to be blended in the main data model blend, wherein the client system uses data location information from the landscape definition to determine which of the different remote systems to send each of the one or more subqueries to;

send, from the client system, each of the one or more subqueries to a corresponding remote system of a plurality of corresponding remote systems for execution on the remote system data set at the corresponding remote system;

receive, at the client system from each corresponding remote system, information regarding a respective set of subquery results from executing the respective subquery on the remote system data set at the corresponding remote system, the information regarding the respective set of subquery results including a location in the corresponding remote system where the subquery results are stored, and each corresponding remote system providing the information regarding the respective set of subquery results after executing the respective subquery, wherein the landscape definition specifies locations in the corresponding remote systems where subquery results are stored using the information regarding the respective set of subquery results received from each corresponding remote system; and send, from the client system to the primary system, the main data model blend query, wherein the main data model blend query comprises the location in the corresponding remote system for each corresponding remote system, wherein client system uses the data location information from the landscape definition to include the location in the main data model blend query, wherein the primary system retrieves the subquery results from the location included in the received information and blends the subquery results.

19. The computer system of claim 18, further comprising:
retrieving at the primary system each set of subquery results from its corresponding remote system using the location in the corresponding remote system; and
performing a data blend operation at the primary system based on the main data model blend query and the retrieved sets of subquery results from each of the remote systems.

20. The computer system of claim 18, further comprising:
- executing each of the one or more subqueries on a remote system data set at the subqueries' corresponding remote system to provide a set of subquery results; and
- storing each set of subquery results on each respective corresponding remote system.

* * * * *